(12) United States Patent
Hottinen et al.

(10) Patent No.: US 7,058,363 B2
(45) Date of Patent: *Jun. 6, 2006

(54) DATA TRANSMISSION METHOD AND RADIO SYSTEM

(75) Inventors: Ari Hottinen, Espoo (FI); Olav Tirkkonen, Helsinki (FI)

(73) Assignee: Nokia Corporation, Espoo (FI)

( * ) Notice: Subject to any disclaimer, the term of this patent is extended or adjusted under 35 U.S.C. 154(b) by 546 days.

This patent is subject to a terminal disclaimer.

(21) Appl. No.: 10/266,931

(22) Filed: Oct. 9, 2002

(65) Prior Publication Data

US 2003/0073410 A1 Apr. 17, 2003

Related U.S. Application Data

(63) Continuation of application No. PCT/FI01/00350, filed on Apr. 9, 2001.

(30) Foreign Application Priority Data

Apr. 10, 2000 (FI) .................................. 20000851

(51) Int. Cl.
*H04B 1/00* (2006.01)

(52) U.S. Cl. .................... 455/69; 455/522; 455/101; 375/299

(58) Field of Classification Search .................. 455/69, 455/522, 101, 103; 375/267, 299; 370/204

See application file for complete search history.

(56) References Cited

U.S. PATENT DOCUMENTS

| 5,541,607 A | 7/1996 | Reinhardt |
| 5,856,804 A | 1/1999 | Turcotte et al. |
| 6,594,473 B1 * | 7/2003 | Dabak et al. ............... 455/101 |

FOREIGN PATENT DOCUMENTS

| DE | 198 34 920 | 3/1999 |
| EP | 0 755 127 | 1/1997 |
| EP | 1 073 212 | 1/2001 |
| WO | WO 99/04519 | 1/1999 |
| WO | WO 99/40689 | 8/1999 |
| WO | WO 00/36764 | 6/2000 |

OTHER PUBLICATIONS

Tarokh et al., "Space-Time Block Codes from Orthogonal Designs," IEEE Transactions on Information Theory, vol. 45, No. 5, Jul. 1999, pp. 1456-1467.

(Continued)

*Primary Examiner*—Lee Nguyen
(74) *Attorney, Agent, or Firm*—Pillsbury Winthrop Shaw Pittman LLP

(57) ABSTRACT

The invention relates to a radio system and a data mission method. In the method of the invention, a transmitter codes a signal to be transmitted such that at least two non-orthogonal channels are obtained; the transmitter transmits the coded channels via at least two different transmit antenna paths; and a receiver receives the signal. The transmit antenna paths are divided into at least two different groups; and the signals to be transmitted through the different groups are weighted in the transmitter by means of changeable weighting coefficients determined for each group.

28 Claims, 8 Drawing Sheets

OTHER PUBLICATIONS

Jafarkhani, "A Quasi-Orthogonal Space-Time Block Code," IEEE Transactions on Communications, vol. 49, No. 1, Jan., 2001, pp. 1-4.

Tirkkonen et al., "Minimal Non-Orthogonality Rate 1 Space-Time Block Code for 3+ Tx Antennas," IEEE 6$^{th}$ Int. Symp. on Spread-Spectrum Tech. and Appli., NJIT, New Jersey, Sep. 6-8, 2000, pp. 429-432.

Hottinen et al., "Transmit Diversity by Antenna Selection in CDMA Downlink," IEEE 5$^{th}$ Int. Symp. on Spread-Spectrum Tech. and Appli., IEEE ISSSTA '98 Proceedings, Sep. 2-4, 1998, South Africa, pp. 767-770.

Calderbank et al., "Space-Time Coding for High Data Rate Wireless Communications," Fifth Workshop on Smart Antennas in Wireless Mobile Communications, Jul. 23-24, 1998, Stanford University, pp. 1-16.

* cited by examiner

DATA TRANSMISSION METHOD AND RADIO SYSTEM

This application is a Continuation of International Application PCT/FI01/00350 filed on Apr. 9, 2001, which designated the U.S. and was published under PCT Article 21(2) in English.

FIELD OF THE INVENTION

The invention relates to a method of transmitting data from a transmitter to a receiver in a radio system employing non-orthogonal channels and at least two different transmission antenna paths in signal transmission.

RELATED ART

In mobile systems, signal fading on the radio path interferes with reliable transmission. The problem is aggravated in new systems in which not only speech but also new services involving transmission of data, for example, and requiring relatively high data transfer rates and extremely good bit error ratios are transmitted.

A solution to the problem is the use of transmit diversity. This means that the base station transmits a signal to a user equipment using two or more antennas. The multipath signal components which have thus propagated via different channels are not likely be disturbed by simultaneous fading.

In selective transmit diversity (STD), the base station transmits a signal to a user equipment by using at least two different antenna candidates. The user equipment measures the quality of the signal transmitted by each antenna candidate and selects the antenna that provides the best quality. The user equipment signals the identification data of the selected antenna to the base station, where after the network part of the mobile system guides the transmissions to the user equipment via the selected antenna. This kind of signaling method forms closed loop control. A problem with this method is that the user equipment must be able to reliably signal the identification data of the selected antenna to the network part. STD is described in *Transmit Diversity by Antenna Selection in CDMA Downlink* by Ari Hottinen and Risto Wichman (IEEE Fifth International Symposium on Spread Spectrum Techniques & Applications. IEEE ISSSTA '98 Proceedings Sep. 2–4, 1998, Sun City, South Africa), which is incorporated herein by reference.

Another way to implement transmit diversity is to use Space-Time Transmit Diversity (STTD). The operating principle of STTD differs from STD in that in STTD the signal is transmitted continuously to the user equipment using at least two different antennas. The signals transmitted through the different antennas differ from one another. There are two ways of providing the difference: space-time trellis codes and space-time block codes.

Space-time trellis codes are described in WO 97/41670, which is incorporated herein by reference. They provide both coding and diversity gain. The codes are formed using a trellis diagram in which each possible state and branches to other states are described using two symbols. When the initial state of the trellis is known, the bits to be coded can be indicated in the trellis diagram by means of symbols denoting transitions between different levels. The obtained symbols are then distributed for transmission through different antennas.

In space-time block codes the bits to be coded are divided into sequences of two bits, for example, which are formed into symbols to be transmitted, such that the symbol to be transmitted through the first antenna consists of the first bit and the complex conjugate of the second bit, and the symbol to be transmitted through the second antenna consists of the second bit and the complex conjugate of the first bit. The forming of space-time block codes is described in *Space-Time Coding for High Data Rate Wireless Communications* by A. R. Calderbank, Hamid Jafakhani, Ayman Naguib, Nambi Seshadri and Vahid Tarokh (Fifth Workshop on Smart Antennas in Wireless Mobile Communications. Jul. 23–24, 1998, Stanford University), which is incorporated herein by reference.

In STTD, the transmit power of the transmit antennas is constant or it can be controlled by means of closed loop control wherein a user equipment measures the quality of the signals it receives on the basis of which the network part adjusts the absolute transmit power of the signal it transmits through the antennas, such that the ratio of the transmit powers is always the same over each transmit antenna path employing transmit diversity. However, this arrangement may cause an unnecessarily high amount of interference to other users of the mobile system. Further, the reliability of signaling is a problem in this method as well, i.e. the user equipment must be able to reliably signal power control data to the network part.

BRIEF DESCRIPTION OF THE INVENTION

It is therefore an object of the invention to provide a method and equipment implementing the method to allow transmit diversity to be advantageously implemented. This is achieved with a method of transmitting data from a transmitter to a receiver in a radio system, in which method the transmitter codes a signal to be transmitted such that at least two non-orthogonal channels are obtained; the transmitter transmits the coded channels via at least two different transmit antenna paths; the receiver receives the signal. Transmit antenna paths are divided into at least two different groups; the signals to be transmitted through the different groups are weighted in the transmitter by means of changeable weighting coefficients determined for each group.

The invention further relates to a radio system comprising: a transmitter for transmitting a signal; at least two transmit antenna paths that can be connected to the transmitter; a receiver for receiving the signal. The transmit antenna paths of the transmitter are arranged into at least two separate groups, and the transmitter comprises changing means for changing the weighting coefficients determined for each transmit antenna path group, and weighting means for weighting the signals to be transmitted via the different transmit antenna path groups by means of changeable weighting coefficients.

Preferred embodiments of the invention are described in the dependent claims. In a preferred embodiment of the invention, the transmit power of the signals to be transmitted through the different groups is weighted in the transmitter with respect to one another.

The invention is partly based on further improving transmit power adjustment with regard to the prior art such that the transmit antenna paths are divided into groups and each transmit antenna path group to be used in the transmit diversity is subject to a separate adjustment, the powers of the transmit antenna path groups being, however, adjusted with respect to one another. In other words, an adjustment of an equal amount is not implemented to all the groups commonly, but not independently for each group either.

The method and arrangement of the invention provide several advantages. Errors occurring in closed loop control, for example in the signaling from the user equipment at the base station, do not impair the performance of the system significantly. In prior art technology, the receiver obeys the closed loop antenna selection commands slavishly whereby erroneous commands may cause random change of transmit antenna. This degrades signal quality. Furthermore, the method described here sustains well errors possibly occurring in a feedback channel.

BRIEF DESCRIPTION OF THE FIGURES

In the following, the invention will be described in greater detail with reference to the preferred embodiments and the accompanying drawings, in which.

DESCRIPTION OF PREFERRED EMBODIMENTS

The invention can be used in radio systems where at least a part of a signal can be transmitted over at least two transmit antenna paths. A transmission channel can be formed using for example a time division, frequency division or code division multiple access method. The invention also covers systems employing combinations of different multiple access methods. The examples describe the use of the invention in a universal mobile telecommunications system employing a direct sequence wideband code division multiple access method, the invention not being, however, restricted thereto.

Figure 1A:
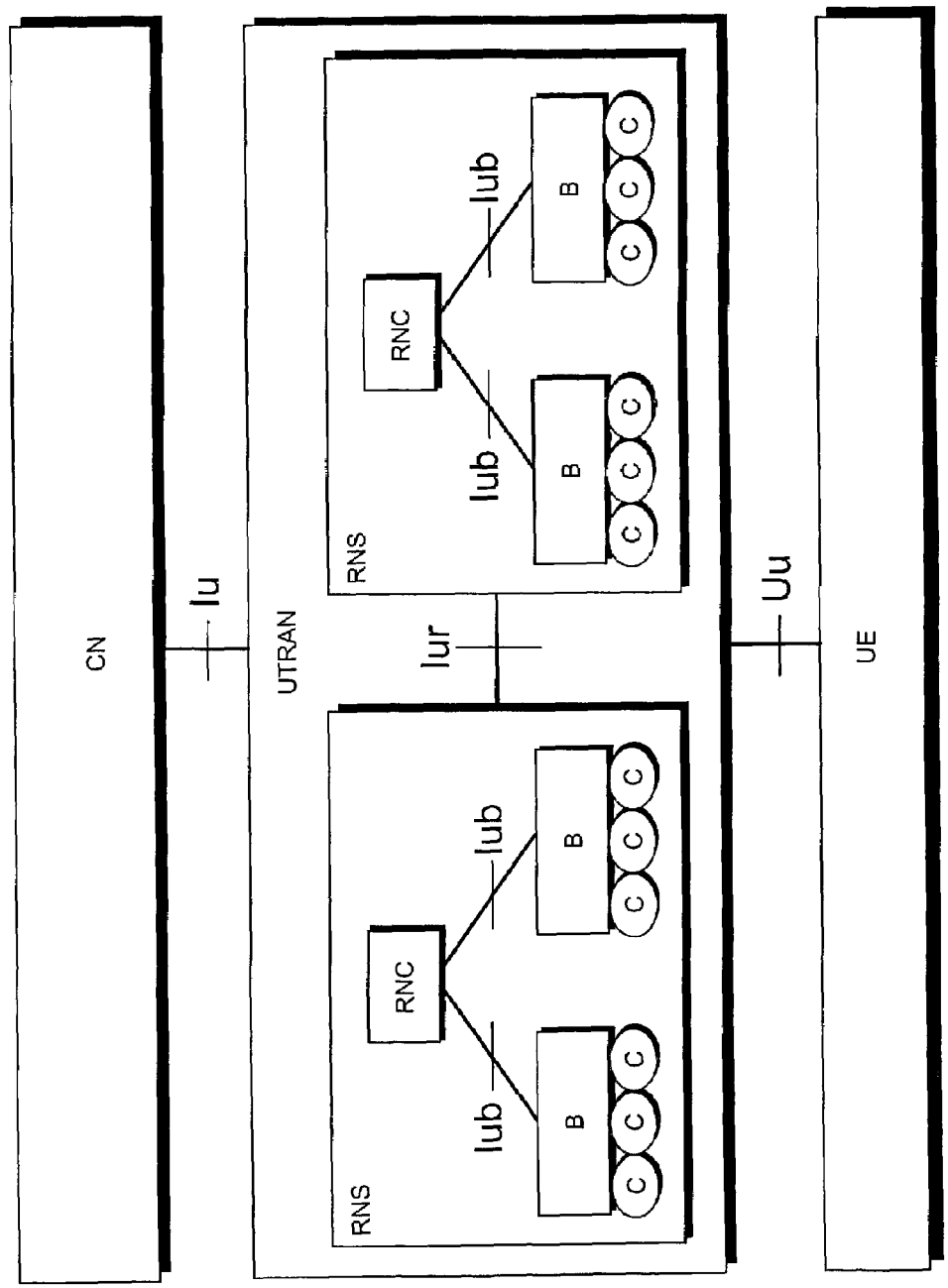
FIGS. 1A and 1B illustrate an example of a system of the invention.
Figure 1B:
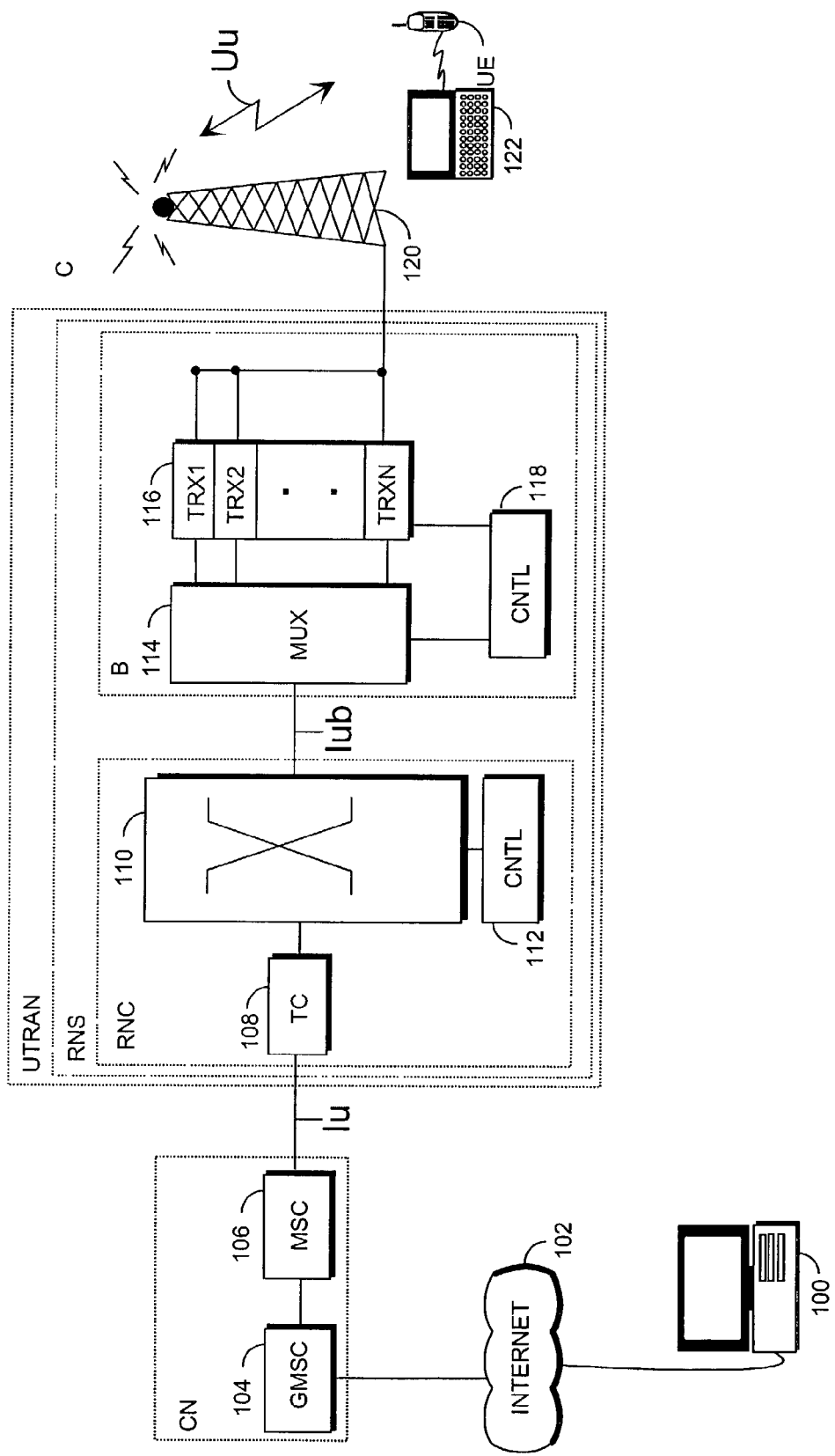

With reference to FIGS. 1A and 1B, the structure of a universal mobile telecommunications system will be described. FIG. 1B shows only the blocks that are essential for illustrating the invention, but it is apparent to those skilled in the art that a conventional mobile system also comprises other functions and structures which need not be described in greater detail herein. The main components of a mobile system are a core network CN, a UMTS terrestrial radio access network UTRAN and a user equipment UE. The interface between the CN and the UTRAN is called Iu, and the air interface between the UTRAN and the UE is called Uu.

The UTRAN consists of radio network subsystems RNS. The interface between RNSs is called Iur. An RNS consists of a radio network controller RNC and one or more nodes B. The interface between an RNC and node B is called Iub. The coverage area of node B, i.e. a cell, is denoted in FIG. 1B by C.

The illustration in FIG. 1A is extremely abstract, wherefore it is further clarified in FIG. 1B by showing which parts of the GSM system and the UMTS approximately correspond to one another. It should be noted that the mapping disclosed herein is not restrictive but only suggestive, since the responsibilities and functions of the different parts of the UMTS are still under development.

FIG. 1B shows packet transmission via the Internet 102 from a computer 100 connected to a mobile system to a portable computer 122 connected to a user equipment UE. The UE can be for example a fixedly positioned terminal equipment, an equipment placed in a vehicle or a portable hand-held device. The radio network infrastructure UTRAN consists of radio network subsystems RNS or base station systems. An RNS consists of a radio network controller RNC, or a base station controller, and at least one node B, or base station, controlled by it.

The base station B comprises a multiplexer 114, transceivers 116 and a control unit 118, which controls the operation of the transceivers 116 and the multiplexer 114. The multiplexer 114 arranges traffic and control channels used by several transceivers 116 on the transmission connection Iub.

The transceivers 116 of the base station B are connected to an antenna unit 120, which implements a bidirectional radio connection Uu to the user equipment UE. The structure of the frames transmitted over the bidirectional radio connection Uu is accurately specified.

The base station controller RNC comprises a group switching field 110 and a control unit 112. The group switching field 110 is used to switch speech and data and to combine signaling circuits. The base station system consisting of the base station B and the base station controller RNC also comprises a transcoder 108. The division of operations between the base station controller RNC and the base station B and the physical structure of the elements may vary in different implementations. The base station B typically manages the implementation of the radio path as described above. The base station controller RNC typically controls the following matters: radio resource management, control of inter-cell handover, power control, timing and synchronization, and paging of user equipments.

The transcoder 108 is usually situated as close to a mobile services switching centre 106 as possible to allow speech to be transmitted in a mobile telephone system form between the transcoder 108 and the base station controller RNC, thus saving transmission capacity. The transcoder 108 adapts different digital speech coding forms used between a public switched telephone network and a mobile telephone network to each other, converting for example a 64 kbit/s fixed network format into some other (such as a 13 kbit/s) format of the cellular radio network, and vice versa. The required equipment is not described in greater detail herein. Suffice it to say that speech is the only type of data that is converted in the transcoder 108. The control unit 112 performs call control, mobility management, collection of statistical data, and signaling.

The core network CN consists of the infrastructure of the mobile telephone system outside the UTRAN. From the devices of the core network CN, FIG. 1B shows the mobile services switching centre 106 and a gateway mobile services switching centre 104, which is responsible for the external connections of the mobile telephone system, in this case for those to the Internet 102.

Figure 2A:
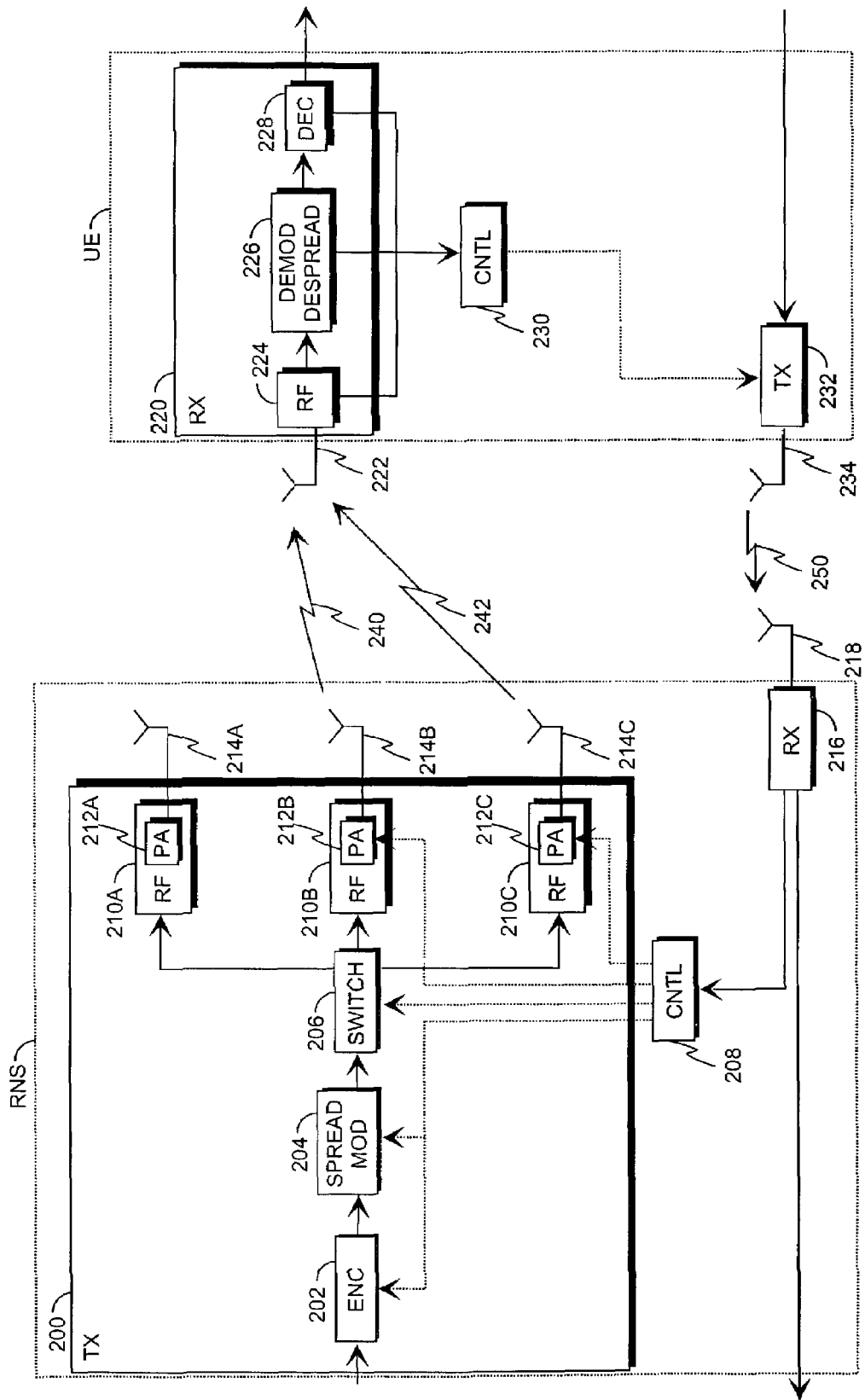
FIG. 2A illustrates the operation of a transmitter and a receiver of the invention.
Figure 2B:
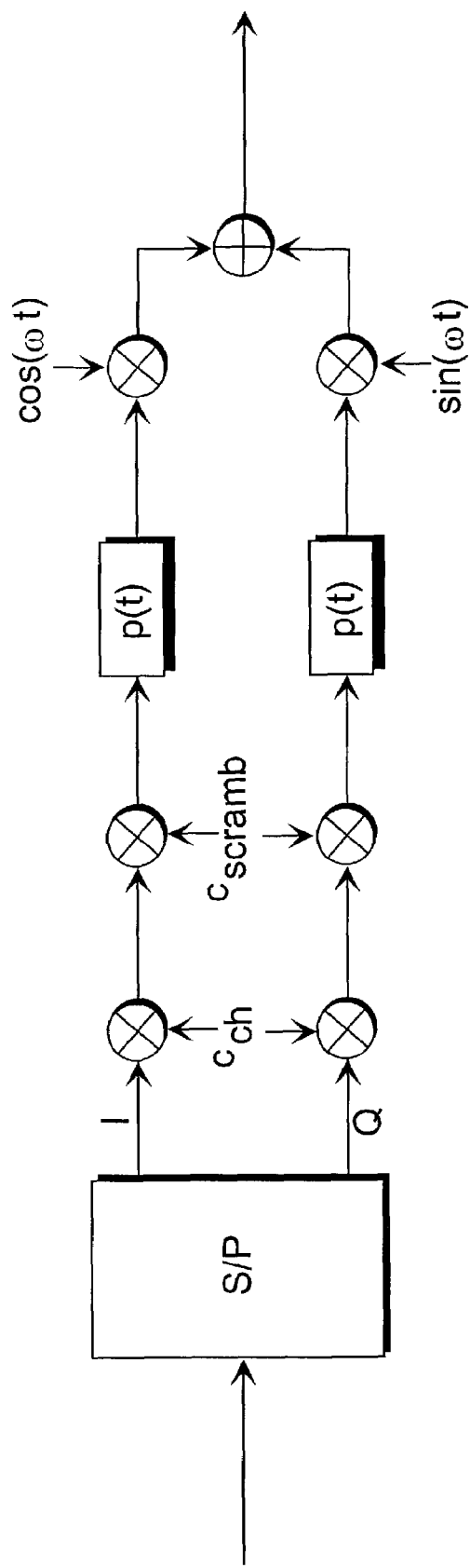
FIG. 2B illustrates spreading and modulation taking place in the transmitter.

FIG. 2B shows in more detail the spreading of a channel with a spreading code and the modulation of the channel. A channel bit stream arrives at block S/P from the left in the Figure. In the block each two-bit sequence is converted from a serial form into a parallel form, which means that one bit is supplied to the I branch of the signal and the other bit to its Q branch. The I and Q branches of the signal are then multiplied by the same spreading code $c_{ch}$, whereby relatively narrowband information spreads over a broad frequency band. Each connection Uu has its own spreading code, which enables the receiver to identify transmissions intended for it. The signal is then scrambled by multiplying it by a scrambling code $c_{scramb}$, which is different for each user equipment and base station. The pulse form of the obtained signal is filtered by a filter p(t). Finally, the signal is modulated into a radio-frequency carrier by multiplying the different signal branches by a carrier. There is a phase shift of 90 degrees between the carriers of the different branches. The different branches are combined into a single carrier, which is ready for transmission to the radio path Uu, excluding possible filtrations and power amplifications. The modulation method described is Quadrature Phase Shift Keying (QPSK).

The maximum number of mutually orthogonal spreading codes that can be used simultaneously is typically 256 different codes. For example in the UMTS, with a carrier of 4.096 megachips, spreading factor 256 corresponds to a transfer rate of 32 kbit/s, and the corresponding highest transfer rate in practice is achieved with spreading factor 4, which gives a data transfer rate of 2048 kbit/s. The transfer rate on a channel thus varies in steps of 32, 64, 128, 256, 512, 1024 and 2048 kbit/s, and the spreading factor changes correspondingly as follows: 256, 128, 64, 32, 16, 8 and 4. The data transfer rate allocated to a user depends on the channel coding used. For example with ⅓ convolutional coding, the user data transfer rate is usually about one third of the channel data transfer rate. The spreading factor may indicate the length of the spreading code. For example the spreading code corresponding to spreading factor 1 is (1). Spreading factor 2 has two mutually orthogonal spreading codes: (1,1) and (1,−1). Further, spreading factor 4 has four mutually orthogonal spreading codes: below a higher-level spreading code (1,1) are spreading codes (1,1,1,1) and (1,1,−1,−1), and below another higher-level spreading code (1,−1) are spreading codes (1,−1,1,−1) and (1,−1,−1,1). Spreading codes on a particular level are usually mutually orthogonal, for example when a Walsh-Hadamard code set is used.

Figure 4:
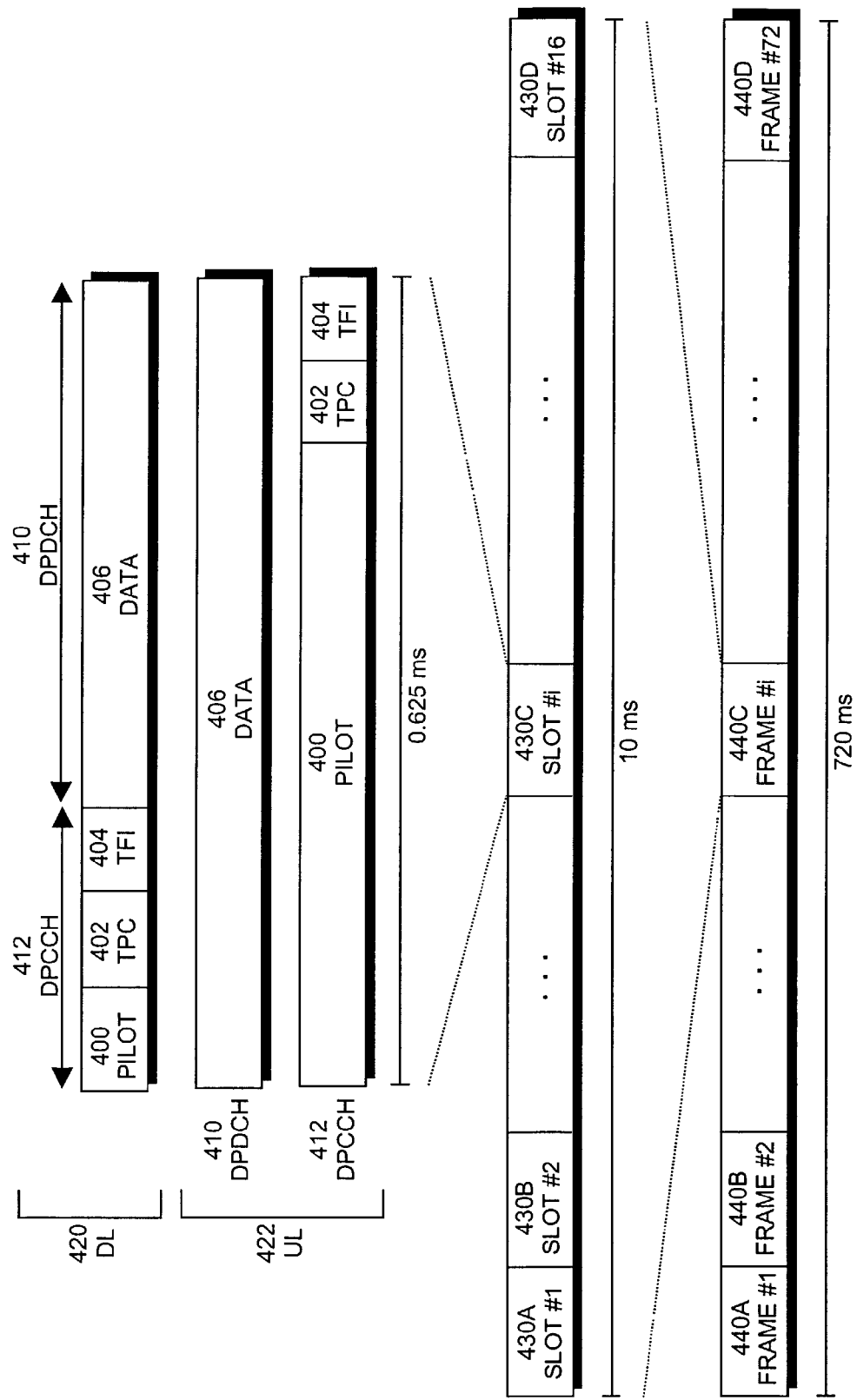
FIG. 4 illustrates channels of the mobile system arranged in a frame.

With reference to FIG. 4, an example of a frame structure that can be used on a physical channel will be described. Other kinds of solutions are naturally also possible because the frame structure is not essential in the present invention. Frames 440A, 440B, 440C, 440D are numbered consecutively from one to seventy-two, and they form a 720-millisecond superframe. The length of one frame 440C is 10 milliseconds. A frame 440C is divided into 16 slots 430A, 430B, 330C, 330D. The length of one slot 330C is 0.625 milliseconds. One slot 430C typically corresponds to one power control period, during which the power is adjusted for example by one decibel up or down.

Physical channels are divided into different types, including common physical channels and dedicated physical channels. Dedicated physical channels consist of dedicated physical data channels (DPDCH) 410 and dedicated physical control channels (DPCCH) 412. The DPDCHs 410 are used to carry data 406 generated in layer two of OSI (Open Systems Interconnection) and in the layers above it, i.e. dedicated control channels and dedicated traffic channels. The DPCCHs 412 carry control information generated in layer one of the OSI. The control information comprises: pilot bits 400 used in channel estimation, transmit power control commands (TPC) 402, and optionally a transport format indicator (TFI) 404. The transport format indicator 404 indicates to the receiver the current transfer rate for each uplink DPDCH.

As FIG. 4 shows, the downlink DPDCHs 410 and DPCCHs 412 are time-multiplexed into the same slot 430C. In the uplink direction the channels are transmitted in parallel so that they are IQ/code-multiplexed (I=in-phase, Q=quadrature) into each frame 440C and they are transmitted using dual-channel quadrature phase-shift keying (QPSK) modulation. If additional DPDCHs 410 are to be transmitted, they are code-multiplexed either into the I or the Q branch of the first channel pair.

FIG. 2A shows a transmitter 200 according to the invention utilizing transmit diversity, and a receiver 220. FIG. 2 shows a downlink situation where the transmitter is situated in the radio network subsystem RNS and the receiver in the user equipment UE.

FIG. 2A shows only the basic functions of the radio transmitter 200. Different services to be conveyed on a physical channel include speech, data, moving or still video image, and system control channels, which are processed in a control part 208 of the radio transmitter. The Figure only shows the processing of data. Different services require different source coding means, for example speech calls for a speech codec. However, for the sake of clarity, the source coding means are not shown in FIG. 2A.

Packets from the computer 100 arrive at the radio network subsystem RNS as shown in FIG. 1B, and they are subjected to channel coding in a channel coder 202. The channel coding is typically carried out using convolutional coding or different modifications thereof, such as turbo coding. Channel coding also includes different block codes, such as cyclic redundancy check (CRC) and the Reed-Solomon code.

In a solution according to a preferred embodiment of the invention, a signal is coded such that at least two non-orthogonal channels are produced. This is preferably carried out using space-time block coding. The transmitter comprises at least two transmit antenna path groups possibly consisting of a plural number of antennas, the groups being used for transmitting said at least two non-orthogonal channels. The transmit antenna path groups may also consist of different antennas or antenna beams possibly created using one and the same antenna group. The signals from the groups are weighted in a manner to be described below. The weighting of the signals is controlled on the basis of the information in the feedback signal transmitted by the receiver.

Let us examine an example of space-time coding which is applied in a preferred embodiment of the invention. The code is non-orthogonal, and the code matrix to be applied when the code is used can be expressed as follows:

$$C_{ABBA}(S_1, S_2, S_3, S_4) = \begin{bmatrix} S_1 & S_2 & S_3 & S_4 \\ -S_2^* & S_1^* & -S_4^* & S_3^* \\ S_3 & S_4 & S_1 & S_2 \\ -S_4^* & S_3^* & -S_2^* & S_1^* \end{bmatrix}. \quad (1)$$

The code consists of two copies of a four-element matrix of the following form:

$$C_A(S_1, S_2) = \begin{bmatrix} S_1 & S_2 \\ -S_2^* & S_1^* \end{bmatrix}, \quad (2)$$

Code matrix (1) is a matrix $C_A$ having symbols $S_1$ and $S_2$ on the matrix diagonal and two copied symbols S3 and S4 on its anti-diagonal, the form of matrix (1) thus being $$\begin{bmatrix} A & B \\ B & A \end{bmatrix}.$$

The code is non-orthogonal between blocks A and B. At the receiver, the amount of non-orthogonality is measured by function $$Re[\alpha_1\alpha_3^* + \alpha_2\alpha_4^*]$$

wherein $\alpha_j$ represents a channel and Re a real part.

In the method of this preferred embodiment of the invention, the transmit antenna paths are divided into two groups, one of which transmits part A of the above described code during first two instants of time and part B of the code during the next two instants of time, and vice versa, to the other antenna group. The signals of the antenna groups are weighted using weighting coefficients $g_1$ and $g_2$. The received signal can now be described with the following formula:

$$\begin{bmatrix} r_1 \\ r_2 \\ r_3 \\ r_4 \end{bmatrix} = \begin{bmatrix} g_1 A(S_1, S_2) & g_2 B(S_3, S_4) \\ g_1 B(S_3, S_4) & g_2 A(S_1, S_2) \end{bmatrix} \begin{bmatrix} \alpha_1 \\ \alpha_2 \\ \alpha_3 \\ \alpha_4 \end{bmatrix} + \text{noise}, \quad (3)$$

wherein A and B represent the above described 2×2 blocks of formula (2). The weighting coefficients $g_1$ and $g_2$ are normalized such that $g_1^2 + g_2^2 = 1$. Non-orthogonality is now illustrated by the following term:

$$g_1 g_2 Re[\alpha_1\alpha_3^* + \alpha_2\alpha_4^*].$$

During transmission, the signal is spread by a spreading code, scrambled by a scrambling code and modulated in block 204, the operation of which was described in greater detail in connection with FIG. 2B.

In the switching field 206 the signal is divided to different transmit antenna paths 214A, 214B, 214C. The control part 208 controls the operation of the switching field 206. Transmit diversity is typically implemented by transmitting the same signal through at least two different transmit antenna paths 214A, 214B, 214C to the user equipment UE. In the example of FIG. 2A, the transmit antenna diversity is implemented using two paths 214B, 214C. When the above-described space-time coding is used, the signal transmitted through the different antennas is not the same. A point to be made here is that in such a case the switching field divides signals having at least partly different contents to different transmit antenna paths 214B, 214C.

On each transmit antenna path 214B, 214C the signal is supplied to radio frequency parts 210B, 210C which comprise a power amplifier 212B, 212C. In addition, the radio frequency parts 210B, 210C may comprise filters restricting the bandwidth. An analog radio signal 240, 242 is then transmitted through the antenna 214B, 214C to radio path Uu.

The radio receiver 220 is typically a Rake receiver. An analogue radio-frequency signal 240, 242 is received from radio path Uu by an antenna 222. The signal 240, 242 is supplied to radio-frequency parts 224 comprising a filter which blocks frequencies outside the desired frequency band. The signal is then converted in a demodulator 226 into an intermediate frequency or directly to a baseband, and the converted signal is sampled and quantized.

Since the signal has arrived via several paths, the multi-path-propagated signal components are preferably combined in block 226 which comprises several Rake fingers according to the prior art.

A rowing Rake finger searches for delays for each multipath-propagated signal component. After the delays have been located, each of the different Rake fingers is allocated to receive a specific multipath-propagated signal component. In the reception a received signal component is correlated by the spreading code used, which has been delayed by the delay located for the multipath in question. The different demodulated and despread multipath-propagated components of the same signal are combined to obtain a stronger signal.

The signal is then supplied to a channel decoder 228, which decodes the channel coding used in the transmission, for example block coding and convolutional coding. Convolutional coding is preferably decoded by a Viterbi decoder. Space-time block coding is decoded by means of linear processing. The originally transmitted data thus obtained is supplied to a computer 122 connected to the user equipment UE for further processing.

The method according to the preferred embodiments of the invention comprises the steps to be described below with reference to FIG. 3A.

In block 300, the at least two transmit antenna paths comprised by the transmitter 200 are divided into at least two different groups. With reference to FIG. 2A, let us assume that in this example the transmit antenna paths 214A–214C are divided into two groups such that the first group comprises path 214B, and the second one comprises path 214C, path 214A being left unused. Another way to make the division is to include paths 214A and 214B into the first group and path 214C into the second one. Moreover, there may be more than two groups, i.e. each path may form a separate group. Hereinafter, transmit antenna path groups will be referred to using the indications and reference numerals of FIG. 2A used as an example.

In block 302 the transmitter codes the signal to be transmitted to provide at least two non-orthogonal channels.

In block 304 the transmit power of the signals to be transmitted via the different transmit antenna path groups 214B, 214C is weighted in the transmitter 200 with respect to one another by means of changeable weighting coefficients determined specifically for each transmit antenna path group 214B, 214C.

In block 306 the transmitter 200 transmits the coded channels via at least two different transmit antenna path groups.

In block 308 the receiver receives the signal.

When a transmitter is being manufactured or the system is being specified or later, for example when the radio network is being set up, the weighting coefficients can be given default values used by the transmitter in the transmit antenna diversity.

Figure 3A:
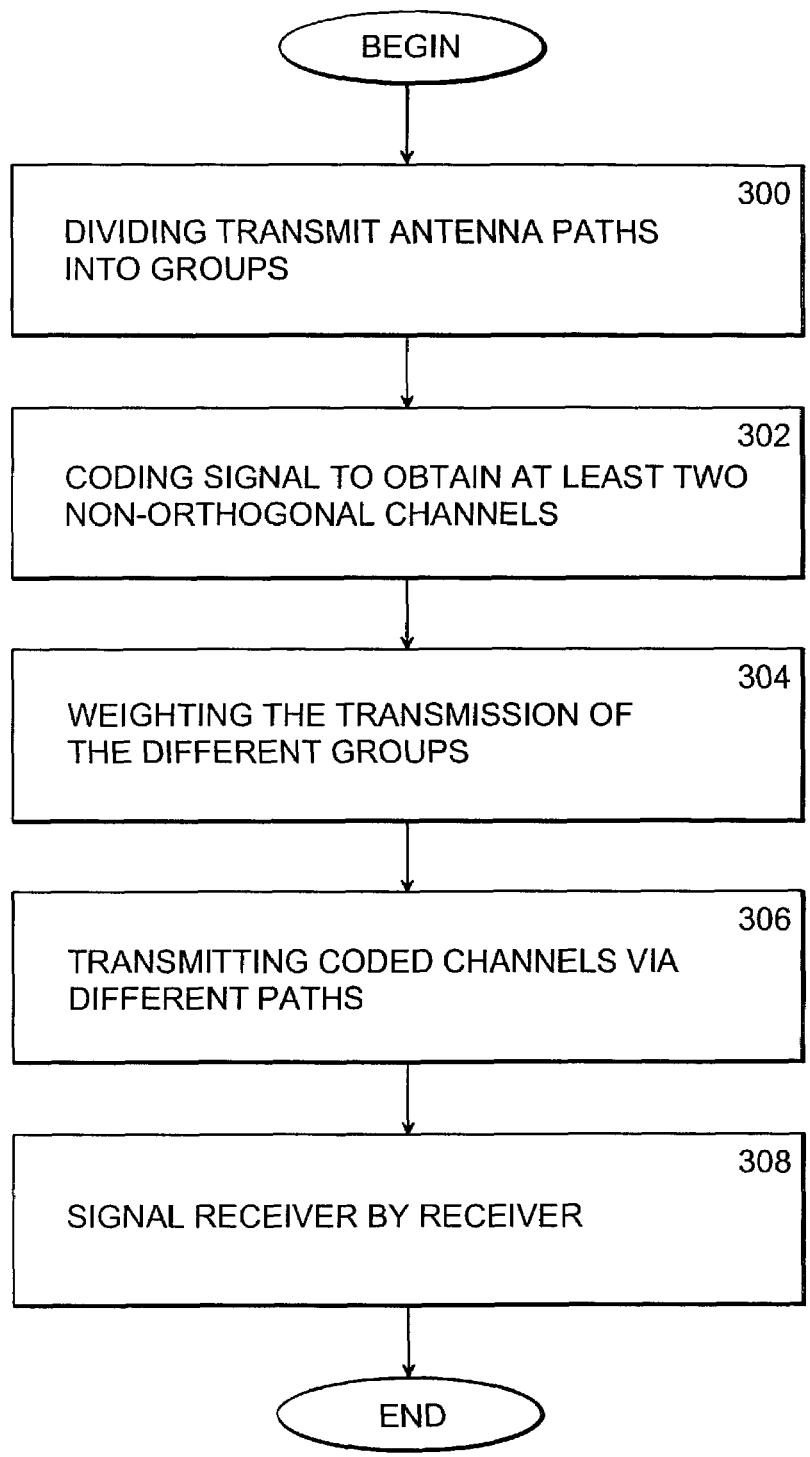
FIG. 3A is a flow diagram illustrating a basic method of the invention.
Figure 3B:
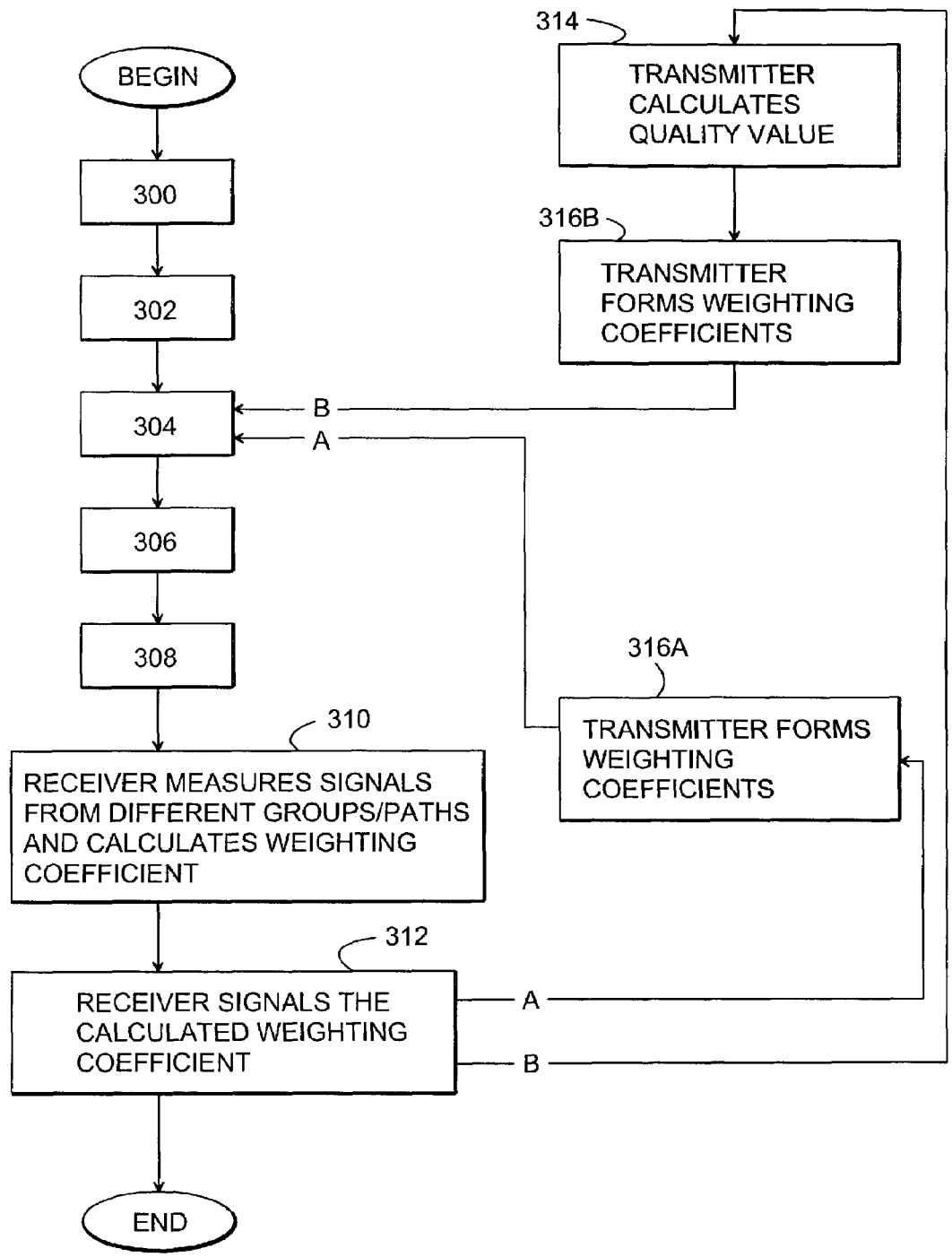
FIG. 3B is a flow diagram illustrating the preferred embodiments of the method of the invention.

FIG. 3B shows how the weighting coefficients can be changed dynamically according to the channel conditions on the radio connection. Blocks 300, 302 and 304 are executed similarly as in FIG. 3A.

In block 310, the receiver 220 performs measurements on each received signal 240, 242 that was transmitted via a separate transmit antenna path group 214B, 214C. The measurements relate to channel conditions, such as channel parameters, signal reception power, bit error ratio, signal/interference plus noise ratio (SINR), or to any other manner in which channel quality can be measured.

In block 312, the receiver 220 signals to the transmitter 200 the weighting coefficient data formed on the basis of the measurements carried out in block 310.

Next, there are two alternative ways to proceed, which are shown in FIG. 3B as two different branches A and B stemming from block 312.

Branch A leads to block 316A, where the transmitter 200 forms weighting coefficients by means of the received signaling indicating the weighting coefficient data.

Branch B leads to block 314, where the transmitter 200 forms a quality value for the weighting coefficient data signaling it has received. In block 316B, the transmitter 200 forms weighting coefficients by means of the quality value for the weighting coefficient data signaling and the signaling itself. A decision on the reliability of the signaling can be made by monitoring the quality value of the signaling: if the signal containing the signaling has propagated in a low-quality channel, it may not be sufficiently reliable to enable a good decision to be made for changing the weighting coefficients by means of the weighting coefficient data signaling. The quality value is formed similarly as described in connection with block 312.

If the signaling can assumed to be reliable, the weighting coefficients can be adjusted for example as follows:

$g_1 = g$, $g_2 = \sqrt{1-g^2}$, $g > \sqrt{1/2}$, if pair 1 is stronger, and $g_2 = g$, $g_1 = \sqrt{1-g^2}$, $g > \sqrt{1/2}$, if pair 2 is stronger.

If the signaling is not very reliable, then a method in which the weighting coefficients are changed incrementally, for example, can be applied, i.e.

$g_1 = g$, $g_2 = \sqrt{1-g^2}$, $g > \sqrt{1/2}$, if pair 1 is stronger during two consecutive signaling events;

$g_1 = g_2 = \sqrt{1/2}$, if the strongest pair changes, and $g_2 = g$, $g_1 = \sqrt{1-g^2}$, $g > \sqrt{1/2}$, if pair two 2 is stronger during two consecutive signaling events. The value of signaling coefficient g is selected to minimize signaling errors. Since the space-time code is non-orthogonal, the optimal value is preferably somewhat higher than $\sqrt{0.8}$.

To achieve optimal performance, the receiver should be iterative if the value of coefficient g is approximately $\sqrt{1/2}$. If the coefficient value is higher, then the amount of non-orthogonality in the code may be so small that iteration is not needed.

Signaling errors can be alleviated by transmitting A and B parts of the signal through the best and the worst antenna group pair. The best pair is weighted with value $g > \sqrt{1/2}$ and the worst with value $\sqrt{1-g^2}$. Some of the signaling can also be used to arrange the channels such that there is as little non-orthogonality as possible.

Let us then examine another example of space-time coding, which is applied in another preferred embodiment of the invention in which at least two antennas and yet at least three transmit antenna paths or channels are used.

Let the channels be represented by terms $\alpha_1$ and $\alpha_2$ and their optimal combination by term $\alpha_1 + w \alpha_2$. Some of the signaling can be reserved for transmitting information relating to coefficient w. When the version of three transmit paths of formula (3) is applied, the third path is a phase-rotated version of an approximated optimal beam:

$$\alpha_3 = j(\alpha_1 + \hat{w}\alpha_2)$$

$$\alpha_4 = 0.$$

The approximated coefficient $\hat{w}$ is a function of the signaling information. Phase shift j in term $\alpha_3$ is selected to minimize non-orthonormality, and it is preferably $$g_1 g_2 Im\ [\alpha_1 \hat{w} \alpha_2^*],$$

where Im represents an imaginary part. In a case of perfect alignment it disappears completely. Some of the signaling information can be used for indicating which of the blocks is stronger. The following formula can be used as an indicator for this purpose:

$$|\alpha_1 + \hat{w}\alpha_2|^2 > |\alpha_1|^2 + |\alpha_2|^2,$$

i.e. to show whether the signaling has succeeded in aligning $\alpha_1$ and $\alpha_2$ by adjusting the value $\hat{w}$. This information is used for selecting coefficients $g_1$ and $g_2$.

Let us now examine the signaling in greater detail. The reliability of signaling can be assigned a threshold value. When the quality value of signaling falls below a predetermined threshold value, the weighting coefficients are not changed. Correspondingly, when the quality value of signaling exceeds a predetermined threshold value, the weighting coefficients are changed. According to a special rule, when the quality value of signaling falls below a predetermined threshold value, the weighting coefficients are made equal over each transmit antenna path 214B, 214C used on the connection. The user equipment can also control the transmitter by changing, i.e. either increasing or decreasing, the reliability of the weighting coefficient signal on purpose. The reliability can be decreased for example by lowering the signal transmit power when the weighting coefficient signaling is carried out. In a CDMA system this can also be carried out by spreading the signaling data by a different spreading code than usually. In such a case the base station can either detect the spreading code with which the signaling was carried out or the signal can be despread without this data. In the latter case the received signal is not very reliable since the base station has used a different code to despread the signal than to spread it.

The frequency of the weighting coefficient data signaling may be such that the weighting coefficient data can be transmitted in each 0.625-millisecond slot 330C shown in FIG. 4. This means that the change frequency of the weighting coefficients is suitably equal to a typical power control period. The weighting coefficient data can even be combined with the transmit power control command field 402 shown in FIG. 4, or it can be placed in some other space reserved for control information in a DPCCH 412.

Weighting coefficient data signaling refers to the signaling the receiver 220 has transmitted to the transmitter 200 to be used in the adjustment of the weighting coefficients. It is evident to those skilled in the art that this signaling can be carried out in several different manners. A few possible manners will be described below, without restricting the invention thereto, however:

1. The weighting coefficient data comprises information indicating the transmit antenna path 214B, 214C via which the signal 240, 242 with the best quality value was transmitted. If there are only two transmit antenna path groups, one bit is sufficient to convey this data. With more path groups more bits are correspondingly used.

2. The weighting coefficient data comprises differential information indicating how the ratios of the weighting coefficients of the transmit antenna path groups 214B, 214C are changed differentially. This can be implemented for example with the following contents of the differential information: "transfer two units of the transmit power of the first transmit antenna path group 214B to the second path group 214C". Differential weighting is an example of a situation where weighting at instant t depends on the relative weighting used at instant t−1. It is also possible to use for example three groups of weighting coefficients: 1:{0.8 0.2}, 2:{0.5 0.5} and 3:{0.2 0.8}, wherein one shift is sufficient for changes 1⇆2, 2⇆3, but change 1<−>3 requires two separate shifts.

3. The weighting coefficient data comprises at least one channel parameter measured by the receiver 220. An advantage of this embodiment is that a great deal of information can be signaled to the transmitter 200, if desired, and therefore the decision on the weighting coefficients can be left to the well-informed transmitter 200. Part of the signal can be used to form transmit antenna path groups and part for the weighting of signals of the transmit antenna path groups.

4. The values of the weighting coefficients are determined in advance. The predetermined values of the weighting coefficients are divided into different groups, each of which comprises a particular weighting coefficient for each transmit antenna path group 214B, 214C. In such a case the weighting coefficient data signaling comprises data about the group of weighting coefficients the receiver 220 wants to be used. With two transmit antenna path groups 214B, 214C, the weight coefficient groups can be for example as follows: {0.5, 0.5}, {0.8, 0.2} and {0.2, 0.8}. It is assumed that the combined transmit power is one. In the first weight coefficient group the transmit power of the transmit antenna path groups 214B, 214C with respect to one another is the same. In the second group, the first transmit antenna path group 214B transmits at power 0.8 and the second transmit antenna path group 214C at power 0.2. In the third group the first transmit antenna path group 214B transmits at power 0.2 and the second path group 214C at power 0.8. If the channel coding method used also enables transmission via only one transmit antenna path group, two more weight coefficient groups can be determined: {1, 0} and {0, 1}. This means that in the fourth group a signal is transmitted via only the first transmit antenna path group 214B. Correspondingly, in the fifth group a signal is transmitted to the receiver 220 via only the second transmit antenna path group 214C.

The receiver uses the channel coefficients of the received signal for signal detection. In order to enable this the signal conventionally comprises a predetermined, known pilot sequence by means of which the channel can be estimated if the channel coefficients change slowly. When weighting is used, the received channel coefficients change due to the transmission path and the weighting of the transmitter. Therefore, the receiver 220 can operate better if it knows the weighting coefficients used by the transmitter 200. If great momentary changes are possible in the weighting coefficients used in the transmission, these coefficients are preferably signaled to the receiver 220 by means of identification bits 400 inserted in the transmitted signal. The operating principle of the bits is described in connection with FIG. 4. Also, if the weighting coefficients have been grouped, the identification data of the group of coefficients used in the transmission is signaled to the receiver 220 by means of identification bits inserted in the transmitted signal. If the weighting coefficients are not to be signaled to the receiver 220, the receiver uses for example blind estimation methods to detect the weighting coefficients used. However, even this is not always necessary. For example when the weighting coefficients are adjusted such that the relative power between two antenna groups is adjusted only by one decimal, the receiver 220 does not necessarily detect this adjustment but interprets it as a change in the channel conditions.

Other alternatives of signaling the used weighting coefficients to the receiver include modulation, spreading or coding of the signal specifically for each transmit antenna path group.

The weighting coefficients can be determined in two different manners: either the user equipment UE in the radio system determines the weighting coefficients to be used by the network part of the radio system RNS in transmitting to the user equipment in question, or the network part RNS determines itself the coefficients it uses. Both alternatives provide advantages. If the user equipment UE makes the decision, the amount of the weighting coefficient data to be signaled can possibly be decreased. On the other hand, if the network part RNS makes the decision, it can possibly utilize data about the loading of the RNS that is not known to the user equipment UE. It is naturally possible to use a combination of these two methods to determine the weighting coefficients.

An example of the network data is that when the network part of the radio system RNS makes the decision, it takes into account the loading of the power amplifier 212B, 212C of each transmit antenna path group 214B, 214C. The power amplifiers 212B, 212C have to be designed to withstand maximum power levels if the signals to be transmitted via the transmit antenna path group 214B in question are adjusted to a high power level. The network part RNS can be programmed to observe a particular power limit for a power amplifier. In such a case the network part RNS locates for each radio connection such a combination of transmit antenna path groups 214A, 214B, 214C that provides a sufficiently good quality of connection and that loads the power amplifiers 212A, 212B, 212C as evenly as possible.

Let us then examine yet another preferred embodiment of the invention, which is in principle similar to FIG. 3A, i.e. signaling from the receiver is not used for selecting the weighting coefficients to be used. In this embodiment the weighting coefficients are used for randomizing the correlation between blocks A and B of the space-time block. In this alternative, a signal from at least one antenna is multiplied by weighting coefficient $w_1$, which is preferably, but not necessarily, complex and which is changed in a pseudo-random manner always after a transmitted block, i.e. after every four symbols. The change in the coefficient may involve its amplitude or phase, or both. In a preferred embodiment comprising four transmit antenna paths, the signal from transmit antenna paths 1 and 2 is multiplied by coefficient $w_1$ and the signal from paths 3 and 4 by coefficient $w_2$.

In this connection, non-orthogonality is now represented by the following term:

$$g_1 g_2 Re[\alpha_1 e^{-j\theta_1} \alpha_3^* e^{-j\theta_2} + \alpha_2 e^{-j\theta_2}],$$

wherein $e^{-j\theta_1}$ represents the phase rotation of transmit antenna group i and $w_i$ is complex weighting coefficient $g_i e^{-j\theta_1}$. Non-orthogonality can be randomized by multiplying the signal of block A by coefficient $w_1$ and the signal of block B by coefficient $w_2$. The randomizing is preferably carried out using block phasing alone, i.e. terms $\theta_1$ and $\theta_2$ (or only one of them) is changed in a pseudo-random manner at intervals of four subsequent symbols.

For example, if only one of the phases is changed in connection with the space-time block code (1) described above, the randomization may be carried out for example by multiplying the signal transmitted by antennas 3 and 4 by a pseudo-random MPSK signal. The MPSK signal multiplies the four symbols transmitted by antennas 3 and 4 of the block code by the same coefficient, a different coefficient being used for the following four-symbol block. The receiver knows the pseudo-random sequence used in the weighting and can take it into account when it receives the signal. The pseudo-random sequence may be a known set of complex numbers.

It is to be noted that the randomization of the correlations is particularly advantageous when the signal has been coded and poor correlation cannot be allowed for the entire coded block.

Figure 5:
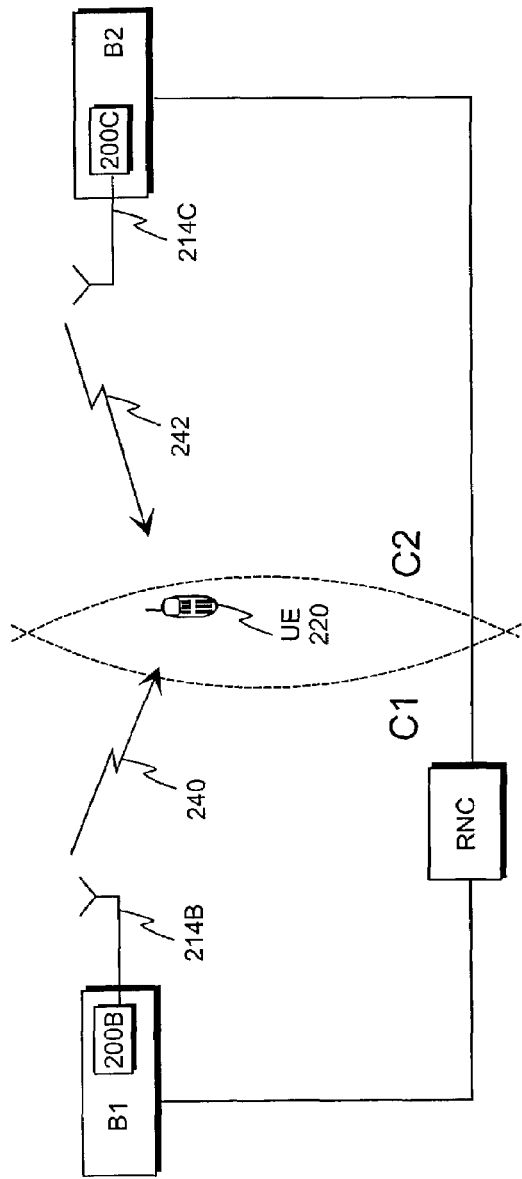
FIG. 5 illustrates a preferred embodiment of the invention.

The example described with reference to FIG. 2A illustrates the use of the invention in a system where the transmit antenna path groups 214A, 214B, 214C used are connected to a single base station B. However, the use of the weighting coefficients according to the invention is also suitable in a system shown in FIG. 5, where a signal 240, 242 is transmitted via transmitters 200B, 200C and transmit antenna path groups 214B, 214C of at least two different base stations B1, B2. A typical situation is soft handover where the base station controller RNC guides a simultaneous transmission to the user equipment UE through two separate base stations B1, B2, for example, the user equipment UE being in this case situated in a border zone between two cells C1, C2. The methods described in connection with FIG. 3B in particular are suitable in such a situation.

Figure 6:
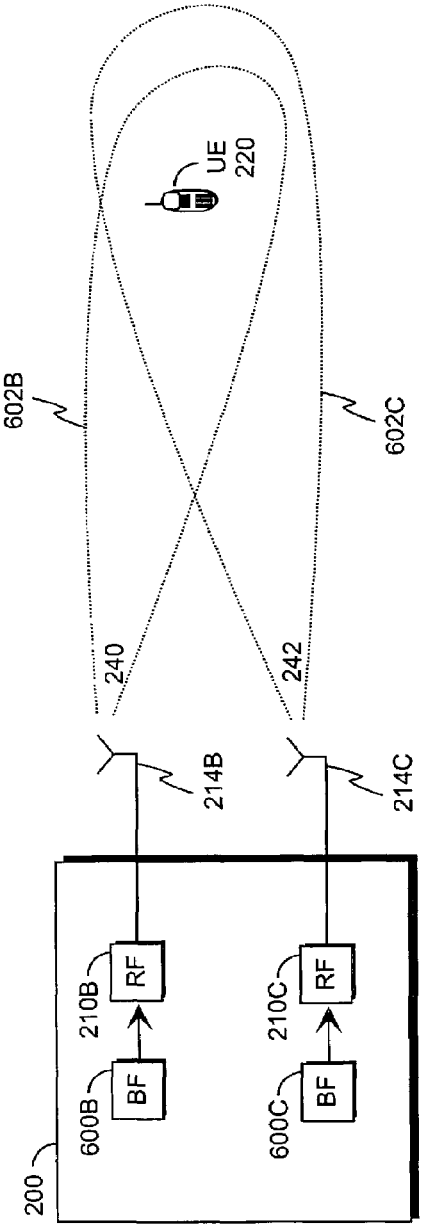
FIG. 6 illustrates another preferred embodiment of the invention.

Transmit antenna path groups 214A, 214B, 214C refer to different ways of implementing an antenna arrangement used in transmission. A common antenna arrangement is the use of omnidirectional antennas. Sectorized base stations B can employ antennas covering a particular transmission sector. A base station B can utilize for example three 120° transmission sectors or even a higher number of at least substantially overlapping sectors. Another possible antenna arrangement is a structure implementing phasing. A phased antenna arrangement enables transmit antenna diversity with directional antenna beams, for example as shown in FIG. 6, where two different transmit antenna path groups 214B, 214C transmit the signal 240 242 to the user equipment UE by means of a directional antenna beam 602B, 602C. In that case the transmitter 200 must comprise beam formers 600B, 600C. The use of adaptive antennas is disclosed in *An Adaptive Antenna Method for Improving Downlink Performance of CDMA Base Stations* by Juha Ylitalo and Marcos Katz (IEEE Fifth International Symposium of Spread Spectrum Techniques & Applications. IEEE ISSSTA '98 Proceedings. Sep. 2–4, 1998, Sun City, South Africa), which is incorporated herein by reference.

However, the only essential features of the preferred embodiments of the invention are that, regardless of the antenna arrangement, transmit antenna diversity in the transmission of at least two non-orthogonal channels and the use of weighting coefficients must be possible. When the space-time block coding is used, it is possible to for example determine a pattern for the transmit antenna path (the phases of the different antennas) by means of the signals which have arrived at the receiver, to select the two strongest signals, and to transmit part of the space-time block code simultaneously to these beams. By using an identifier for the beam or the transmit antenna path the user equipment can estimate weighting coefficients for the aforementioned two beams. Naturally, the complex phasing that determines a beam can be signaled to the transmitter by means of a closed loop, but this arrangement is only advantageous if the number of the transmit antennas is low. It is thus possible to separate the measurements and signaling determining the transmit antenna path and the weights used for the selected transmit antenna paths.

The antenna phasing can be determined by means of the channel parameters signaled by the receiver.

The phasing of the transmission can be determined by means of signals arriving at the same antenna elements. This means that transmissions are sent to the same directions from which signals have been received on average. A direction is estimated for example over one slot (0.625 ms), frame (10 ms) or a longer interval of time.

In an embodiment transmissions are sent from at least one antenna element by means of at least two different phases or two different antenna beams, such that the signals that are transmitted with different phases have different pilot sequences, identification sequences, structures or different coding, preferably different parts of a space-time code, by means of which channel parameters of the beams are estimated, signals of the beams are combined, weighting coefficient information of the beams is calculated and signaled to the transmitter.

In the radio system of FIG. 2A, the invention requires that the transmitter 200 comprises changing means 208 for changing the weighting coefficients determined for each transmit antenna path 214B, 214C with respect to one another. The transmitter also comprises weighting means 208, 212B, 212C for weighting the transmit power of the signals 240, 242 to be transmitted via the different transmit antenna paths 214B, 214C by means of weighting coefficients that can be changed with respect to one another. The weighting means consist of power amplifiers 212A, 212B, 212C and the control logic thereof.

The invention is preferably implemented by means of software, wherefore the transmitter 200 comprises a control unit 208 where the changing means 208 and the control logic for the weighting means are implemented by software. The invention can naturally also be implemented by means of integrated circuits providing the required functions. The invention also requires restricted changes in the software of the control units controlling the operation of the base station controller RNC, the base station B and the user equipment UE.

The receiver 220 comprises means 230 for performing measurements on the received signal transmitted via each different transmit antenna path, and means 230, 232 for signaling to the transmitter 200 the weighting coefficient data formed on the basis of the measurements. The measuring means 230 are prior art devices. Similarly, the signaling means 230, 232 are known, i.e. in practice they consist of the signaling software and the transmitter of the user equipment UE. The weighting coefficient data signaling is transmitted in the form of a radio signal 250 by a transmit antenna 234.

The transmitter 200 comprises means 216 for receiving the weighting coefficient data signaling, and the changing means 208 form the weighting coefficients by means of the signaling. The reception means 216 consist of the radio receiver 216 with the antennas 218 and the signaling software. The changing means 208 are preferably implemented by software.

The transmitter 200 comprises means 208, 216 for forming a quality value for the weighting coefficient data signaling it has received, and the changing means 208 form weighting coefficients by means of the quality value of the signaling and the signaling itself. The means for forming the quality value are previously known.

The transmitter 200 comprises means 208 for signaling to the receiver the weighting coefficients or the identification data of the group of weighting coefficients used in the transmission by means of pilot or identification bits inserted in the transmitted signal 240, 242. This concerns accurately restricted changes made in the signaling software.

The user equipment UE may comprise means 230 for determining the weighting coefficients used by the network part of the radio system when transmitting to the user equipment UE in question. This is a decision-making logic preferably implemented by software, utilizing the rules described above in connection with the method.

The network part RNS can comprise decision-making means 208 for determining the weighting coefficients used in the transmission. This is preferably a decision-making logic implemented by software, utilizing the rules described above in connection with the method.

Even though the invention is described above with reference to an example according to the accompanying drawings, it is clear that the invention is not restricted thereto but it can be modified in several ways within the scope of the inventive idea disclosed in the appended claims.

The invention claimed is:

1. A method of transmitting data from a transmitter to a receiver in a radio system, the method comprising:
    dividing the transmit antenna paths into at least two different groups;
    coding a signal to be transmitted such that at least two non-orthogonal channels are obtained;
    weighting the signals to be transmitted through the different groups are by means of changeable weighting coefficients determined for each group;
    transmitting the coded channels via at least two different transmit antenna paths;
    receiving the signal.

2. A method according to claim 1, further comprising the steps of
    performing measurements in the receiver on each received signal transmitted via a separate transmit antenna path group and forms weighting coefficient data;
    signaling by the receiver to the transmitter the weighting coefficient data formed on the basis of the measurements;
    forming by the transmitter weighting coefficients using the signaling indicating the weighting coefficient data.

3. A method according to claim 2, further comprising the steps of
    forming by the transmitter a quality value for the weighting coefficient data signaling it has received;
    forming by the transmitter weighting coefficients by means of the quality value for the weighting coefficient data signaling and the signaling itself.

4. A method according to claim 2, where in the values of the weighting coefficients are determined in advance, and the predetermined values of the weighting coefficients are divided into different groups, each of which comprises a particular weighting coefficient for each transmit antenna path group, the weighting coefficient data signaling comprising information about the group of weighting coefficients the receiver wants to be used.

5. A method according to claim 2, where in the weighting coefficient data comprises information indicating the transmit antenna path via which the signal with the best quality value was transmitted.

6. A method according to claim 2, where in the weighting coefficient data comprises differential information indicating how the ratios of the weighting coefficients of the transmit antenna paths are changed differentially.

7. A method according to claim 2, where in the weighting coefficient data comprises at least one channel parameter measured by the receiver.

8. A method according to claim 2, where in the transmit antenna paths are connected to at least two different base stations of the radio system network part.

9. A method according to claim 1, where in the coding is space-time block coding.

10. A method according to claim 9, where in the weighting is carried out such that randomness in the correlation between the separate blocks of a block-coded signal is increased.

11. A method according to claim 9, where in the weighting is carried out such that phase difference between the blocks of a block-coded signal varies from one block to another.

12. A method according to claim 9, where in the weighting is carried out such that amplitude in the blocks of a block-coded signal varies from one block to another.

13. A method according to claim 9, where in the weighting is carried out such that a signal transmitted at least by one antenna is weighted in a pseudo-random manner.

14. A method according to claim 9, where in the weighting is carried out such that a signal transmitted by at least one antenna is multiplied by a coefficient selected in a pseudo-random manner.

15. A method according to claim 1, where in the weighting coefficient is a complex number.

16. A method according to claim 1, where in the weighting coefficient is a real number.

17. A method according to claim 1, where in the weighting coefficients used in transmission are signaled to the receiver.

18. A method according to claim 17, where in the weighting coefficients are signaled to the receiver using an identification sequence which is inserted in the transmitted signal and which varies depending on the weighting of the signal.

19. A method according to claim 1, where in the transmit power of the signals to be transmitted via the different groups is weighted in the transmitter with respect to one another.

20. A radio system comprising
    a transmitter for transmitting a signal and a receiver for receiving the signal, and at least two transmit antenna paths that can be connected to the transmitter; which paths are arranged in at least two separate groups, the transmitter comprising
    weighting means for weighting the signals to be transmitted via the different transmit antenna path groups by means of changeable weighting coefficients
    means for coding the signal to be transmitted such that at least two non-orthogonal channels are obtained and
    changing means for changing weighting coefficients determined for each transmit antenna path group.

21. A radio system according to claim 20, where in the receiver comprises means for performing measurements on the received signals that were transmitted via each one of the different transmit antenna path groups, and means for signaling to the transmitter the weighting coefficient data formed on the basis of the measurements;

the transmitter comprises means for receiving the weighting coefficient data signaling, and the changing means forming weighting coefficients by means of the weighting coefficient data signaling.

22. A radio system according to claim 21, where in the transmitter comprises means for forming a quality value for the weighting coefficient data signaling it has received, and the changing means forming weighting coefficients by means of the quality value of the weighting coefficient data signaling and the signaling itself.

23. A radio system according to claim 21, where in the values of the weighting coefficients are determined in advance, and the predetermined values of the weighting coefficients are divided into different groups, each of which has a particular weighting coefficient determined for each transmit antenna path group, the weighting coefficient data signaling comprising information about the group of weighting coefficients the receiver wants to be used.

24. A radio system according to claim 21, where in the weighting coefficient data comprises information indicating the transmit antenna path group via which the signal with the best quality value was transmitted.

25. A radio system according to claim 21, where in the weighting coefficient data comprises differential information indicating how the ratios of the weighting coefficients of the transmit antenna path groups are changed differentially.

26. A radio system according to claim 21, where in the weighting coefficient data comprises at least one channel parameter measured by the receiver.

27. A radio system according to claim 21, where in the transmit antenna path groups are connected to at least two different base stations of the radio system network part.

28. A radio system according to claim 20, where in the radio system comprises changing means for changing the weighting coefficients determined for each transmit antenna path group with respect to one another, and weighting means for weighting the signals to be transmitted via different transmit antenna path groups by means of weighting coefficients which can be changed with respect to one another.

* * * * *